M. TOCH.
PROCESS OF TREATING PORTLAND CEMENT SURFACES AND PRODUCT.
APPLICATION FILED APR. 18, 1908.
943,327.
Patented Dec. 14, 1909.
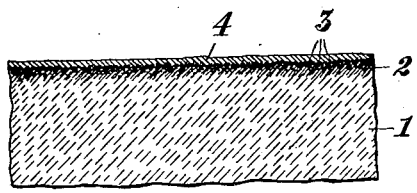

UNITED STATES PATENT OFFICE.

MAXIMILIAN TOCH, OF NEW YORK, N. Y.

PROCESS OF TREATING PORTLAND-CEMENT SURFACES AND PRODUCT.

943,327.

Specification of Letters Patent. Patented Dec. 14, 1909.

Application filed April 18, 1908. Serial No. 427,858.

*To all whom it may concern:*

Be it known that I, MAXIMILIAN TOCH, a citizen of the United States, residing at New York, in the county of New York and State of New York, have invented certain new and useful Improvements in Processes of Treating Portland-Cement Surfaces and Products, of which the following is a specification.

In my United States Letters Patent No. 813,841, dated February 27, 1906, I have described and claimed a method of treating Portland-cement constructions by first applying to the surface of the cement a liquid filler containing an acid resin, a vegetable drying oil and a diluent, and then applying a finishing coating containing a dissolved resin and a pigment. The acid filler reacts with the calcium compounds in the cement to form a hard calcium-resinate which protects the cement from abrasion and is reinforced by the second coating. I have now found that finely-divided silica, or other inert solid material in the form of fine angular fragments, may be advantageously mixed with the filler, remaining as a rough layer on the surface of the cement after the filler has reacted with it to superficially convert the contained calcium into a hard layer of an organic-acid salt. The finishing coat then adheres tenaciously to the rough surface of the chemically-hardened cement.

According to my present invention, I first treat the cement with a filler consisting of a mixture of a vegetable drying oil, containing a small percentage of a free acid which will combine with calcium, and finely-divided silica or its equivalent. Raw linseed, China, or perilla oil, or a mixture of two or all of these oils, may be used. The silica may be replaced, for example, by finely-divided crystalline calcium carbonate or sulfate, barium sulfate, or magnesium or aluminum silicate. The filler should contain an amount of the finely-divided material dependent on the specific gravity of the latter. For example, I add to each gallon of the oil or mixed oils, either one pound of a material having a specific gravity of 2; 1.5 pounds of a material having a specific gravity of 2.5; or 2 pounds of any material having a specific gravity above 2.5.

The new filler is cheaper than the one previously patented by me, is effective as a hardener and affords a better basis for the finishing coat, which may be a mixture of a dissolved resin and a pigment, as heretofore. The calcium oil soap produced by the action of the new filler on the cement is a satisfactory substitute for the calcium resinate layer of my previous patent. The silica or other finely-divided material is intimately associated with the hardened layer produced by the action between the acids of the oil in the filler and the Portland cement, and, in turn, furnishes a rough surface to which the finishing coat firmly adheres.

The accompanying drawing shows, in transverse section, a mass of Portland cement 1, having a surficial layer 2 of a calcium oil soap carrying particles of finely-divided silica 3, and a finishing coat 4 superposed upon and adhering to the rough, hard surficial layer.

I claim:—

1. The process of treating Portland-cement surfaces, which consists in first superficially hardening the cement by converting calcium therein to an organic-acid salt, and simultaneously providing the cement with a rough surface, and then applying a finishing coating.

2. The process of treating Portland-cement surfaces, which consists in first applying to the cement a mixture containing a dissolved organic acid and a suspended finely-divided inert solid, thereby simultaneously superficially converting calcium in the cement into a hard organic-acid salt and providing the cement with a rough surface, and then applying a finishing coating.

3. The process of treating Portland-cement surfaces, which consists in first applying to the cement a mixture of a vegetable oil containing a dissolved free acid and a suspended finely-divided inert solid, thereby simultaneously superficially converting calcium in the cement into a hard organic-acid salt and providing the cement with a rough surface, and then applying a finishing coating.

4. A Portland-cement construction having a rough surficial layer containing a calcium organic-acid salt, and a finishing coat superposed upon and adhering to said rough layer.

5. A Portland-cement construction having a rough surficial layer containing a calcium oil soap, and a finishing coat superposed upon and adhering to said rough layer.

6. A Portland-cement construction having a hard surficial layer carrying a finely-divided inert solid, and a finishing coat superposed upon and adhering to said surface layer.

7. A Portland-cement construction having a surficial layer containing a calcium oil soap and carrying finely-divided silica, and a finishing coat superposed upon and adhering to said surface layer.

In testimony whereof, I affix my signature in presence of two witnesses.

MAXIMILIAN TOCH.

Witnesses:
HARRY E. BAER,
ROBT. M. WHITESEN.